US011962685B2

(12) United States Patent
Coyle

(10) Patent No.: US 11,962,685 B2
(45) Date of Patent: Apr. 16, 2024

(54) HIGH AVAILABILITY SECURE NETWORK INCLUDING DUAL MODE AUTHENTICATION

(71) Applicant: Raytheon Company, Waltham, MA (US)

(72) Inventor: Michelle D. Coyle, Marblehead, MA (US)

(73) Assignee: RAYTHEON COMPANY, Waltham, MA (US)

(*) Notice: Subject to any disclaimer, the term of this patent is extended or adjusted under 35 U.S.C. 154(b) by 157 days.

(21) Appl. No.: 16/962,363

(22) PCT Filed: Nov. 28, 2018

(86) PCT No.: PCT/US2018/062770
§ 371 (c)(1),
(2) Date: Jul. 15, 2020

(87) PCT Pub. No.: WO2019/143404
PCT Pub. Date: Jul. 25, 2019

(65) Prior Publication Data
US 2021/0067329 A1 Mar. 4, 2021

Related U.S. Application Data

(60) Provisional application No. 62/617,870, filed on Jan. 16, 2018.

(51) Int. Cl.
H04L 9/08 (2006.01)
H04L 9/32 (2006.01)
(52) U.S. Cl.
CPC ............ H04L 9/0833 (2013.01); H04L 9/085 (2013.01); H04L 9/0891 (2013.01); H04L 9/3273 (2013.01)

(58) Field of Classification Search
CPC ..... H04L 9/0833; H04L 9/085; H04L 9/0891; H04L 9/3273
See application file for complete search history.

(56) References Cited

U.S. PATENT DOCUMENTS 8,270,414 B2 * 9/2012 Oi .................. H04W 84/20
370/400
8,447,040 B2 * 5/2013 Goto ................. H04W 12/041
380/279

(Continued)

FOREIGN PATENT DOCUMENTS

EP 2220810 B1 3/2018

OTHER PUBLICATIONS

IEEE Computer Society, IEEE Standard for Local and metropolitan area networks—Port-Based Network Access Control, Feb. 5, 2010, The Institute of Electrical and Electronics Engineers, Inc., IEEE Std 802.1X-2010 (Year: 2010).*

(Continued)

Primary Examiner — Jung W Kim
Assistant Examiner — Alan L Kong
(74) Attorney, Agent, or Firm — CANTOR COLBURN LLP

(57) ABSTRACT

A large-scale Ethernet mesh network including a plurality of dual-mode peer devices in signal communication with one another so as to establish a group connectivity association (CA). Each dual-mode peer device simultaneously operates in a supplicant mode and authenticator mode. Each of dual-mode peer device encrypts data using a shared group encryption key (SAK), and exchanges the encrypted data with peer devices in the group CA.

18 Claims, 7 Drawing Sheets

(56) References Cited

U.S. PATENT DOCUMENTS

| | | | |
|---|---|---|---|
| 8,959,607 B2* | 2/2015 | Yadav | H04L 9/14 |
| | | | 713/168 |
| 8,984,606 B2 | 3/2015 | Kamat | |
| 2004/0098588 A1 | 5/2004 | Ohba et al. | |
| 2007/0101406 A1 | 5/2007 | Zavalkovsky et al. | |
| 2007/0189249 A1* | 8/2007 | Gurevich | H04L 45/26 |
| | | | 370/338 |
| 2008/0063204 A1* | 3/2008 | Braskich | H04L 9/0836 |
| | | | 380/270 |
| 2010/0296441 A1* | 11/2010 | Barkan | H04W 12/35 |
| | | | 370/328 |
| 2011/0296044 A1 | 12/2011 | Weis | |
| 2014/0362836 A1* | 12/2014 | Locker | H04W 4/023 |
| | | | 370/338 |

OTHER PUBLICATIONS

"IEEE/ISO/IEC Information Technology—Telecommunications and Information Exchange Between Systems—Local and Metropolitan Area Networks—Part 1X: Port-Based Network Access Control" ISO/IEC/IEEE 8802-1X:2013(E); IEEE Standard, IEEE, Dec. 12, 2013 (222 pages).

International Search Report and Written Opinion issued in International Application No. PCT/US2018/062770; Application Filing Date Nov. 28, 2018; dated Feb. 11, 2019 (16 pages).

* cited by examiner

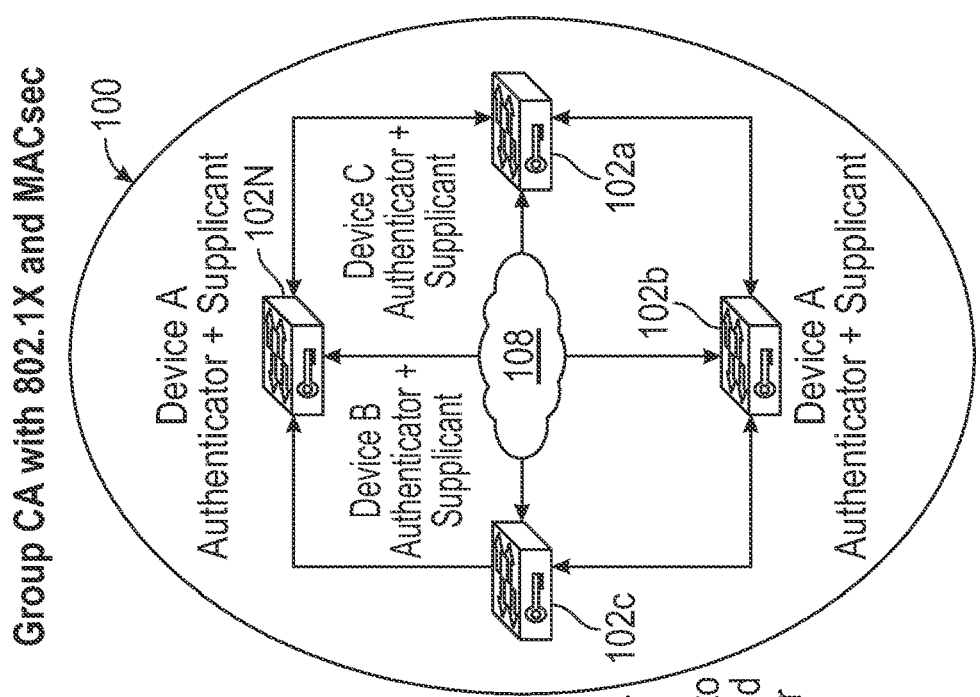
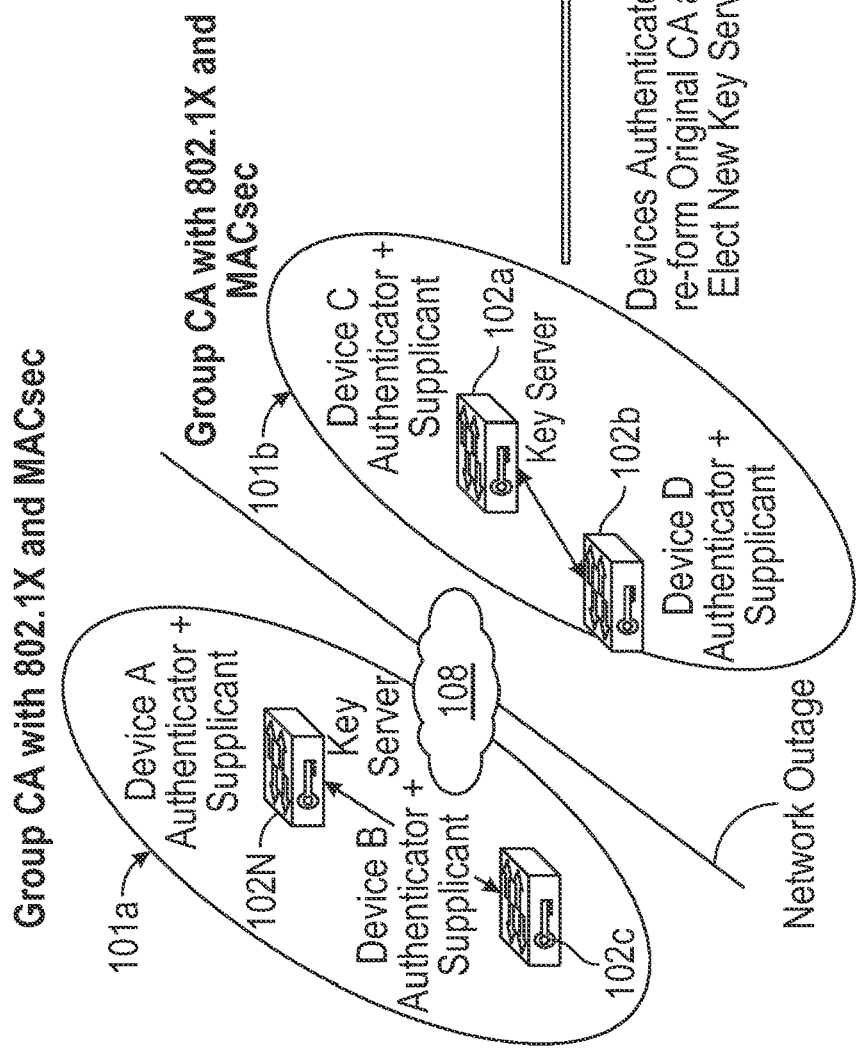
FIG. 6B
FIG. 6A

HIGH AVAILABILITY SECURE NETWORK INCLUDING DUAL MODE AUTHENTICATION

CROSS-REFERENCE TO RELATED APPLICATIONS

This application is a National Stage of International Application Serial No. PCT/US2018/062770, filed Nov. 28, 2018, which claims priority to U.S. Provisional Application Ser. No. 62/617,870, filed Jan. 16, 2018, the contents of which are hereby incorporated by reference in its entirety.

BACKGROUND

Various non-limiting embodiments relate generally to local area networks, and more particularly, to mesh networking topologies.

Mesh networking topologies have gained interest in recent years due to their robustness and ability to continue operating should one or more nodes fail. For instance, peer devices or supplicant nodes (referred to herein simply as supplicants) gain access to the mesh node (i.e., are authenticated) using pre-shared authentication keys. Once a supplicant is authenticated, it can connect directly, dynamically and non-hierarchically to any other authenticated supplicant included in the mesh network. In this manner, the authenticated supplicants can cooperate with one another to efficiently exchange data.

However, unlike other communication networking topologies such as point-to-point topologies where each device or node requesting access to the network is provided a different authentication key, a mesh network uses a single shared group encryption key to facilitate secure communication between all supplicants authenticated to participate in the group connectivity association (CA).

In addition, mesh networks dynamically self-organize and self-configure, which can reduce installation overhead. The ability to self-configure enables dynamic distribution of workloads, particularly in the event that a few nodes should fail. This in turn contributes to fault-tolerance and reduced maintenance costs.

Mesh networks can be implemented as a wired network such as an Ethernet-based mesh network, for example. Conventional mesh networks are governed according to the standards defined by Institute of Electrical and Electronics Engineers (IEEE) 802.1X-2010. However, the protocol defined by IEEE 802.1X-2010 limits a conventional mesh network to employing no more than 30 nodes.

SUMMARY

According to a non-limiting embodiment, a large-scale Ethernet mesh network including a plurality of dual-mode peer devices in signal communication with one another so as to establish a group connectivity association (CA). Each dual-mode peer device simultaneously operates in a supplicant mode and authenticator mode. Each of dual-mode peer device encrypts data using a shared group encryption key (SAK), and exchanges the encrypted data with peer devices in the group CA.

According to another non-limiting embodiment, a method of exchanging data in a large-scale Ethernet mesh network comprises establishing signal communication between a plurality of dual-mode peer devices. Each dual-mode peer device is configured to simultaneously operate in supplicant mode and an authenticator mode. The method further comprises mutually authenticating a plurality of dual-mode devices to form a group connectivity association (CA). The method further comprises exchanging encrypted data between sending dual-mode peer devices and receiving dual-mode peer devices in the group CA, using a shared group encryption key (SAK).

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts:

FIGS. 6A and 6B are diagrams of the large-scale Ethernet mesh network performing an outage recovery process according to a non-limiting embodiment.

DETAILED DESCRIPTION

Ethernet mesh networks designed under standard of Institute of Electrical and Electronics Engineers (IEEE) 802.1X-2010, for example, employ an authenticator module and a key server to establish secured data communication between authenticated peer devices, referred to as supplicant nodes. While the authenticator module manages authenticated and authorized access to the group CA, the key server manages the periodic creation and distribution of a shared group key referred to as a Connectivity Association Keys (CAKs), and a shared group encrypting key referred to as a Secure Association Key (SAK) among the authenticated supplicant nodes participating in the group CA. The CAK is distributed first and enables subsequent distribution of the SAK.

The continuous protection of Layer 2 user data with Media Access Control Security (MACsec) is dependent on reliable access to an authenticator module and the continuous operating presence of the key server. Conventional mesh networks do not strictly tie the operation of the key server to the authenticator module, nor do they clearly identify a comprehensive strategy to provide uninterrupted MACsec service during temporary network outages or normal changes in the membership of a group CA. A lack of an authenticator module, an elected key server, and/or changes to the key server can result in temporary MACsec outages and a lack of network availability. Thus, conventional mesh networks were designed with a single failure point in the group CA, where the loss of the authenticator causes a failure to manage the membership of the CA while the loss of the Key Server represents the termination of participation in the CA. For example, loss of the authenticator in a conventional mesh network results in the inability to continue management of group CA membership while loss of the key server results in the termination of 802.1X protocol participation and the underlying MACsec service by the remaining members in the group CA.

Various non-limiting embodiments described herein provide a large mesh layer 2 Ethernet network including authenticator redundancy and failover measures. In one or more embodiments, the large mesh layer 2 Ethernet network supports dual-mode peer devices capable of operating as both a supplicant node and an authenticator node. In this manner, a plurality of dual-mode peer devices can be mutually authenticated to establish a large mesh layer 2 Ethernet network, which eliminates the single failure point found in conventional mesh networks.

Figure 1:
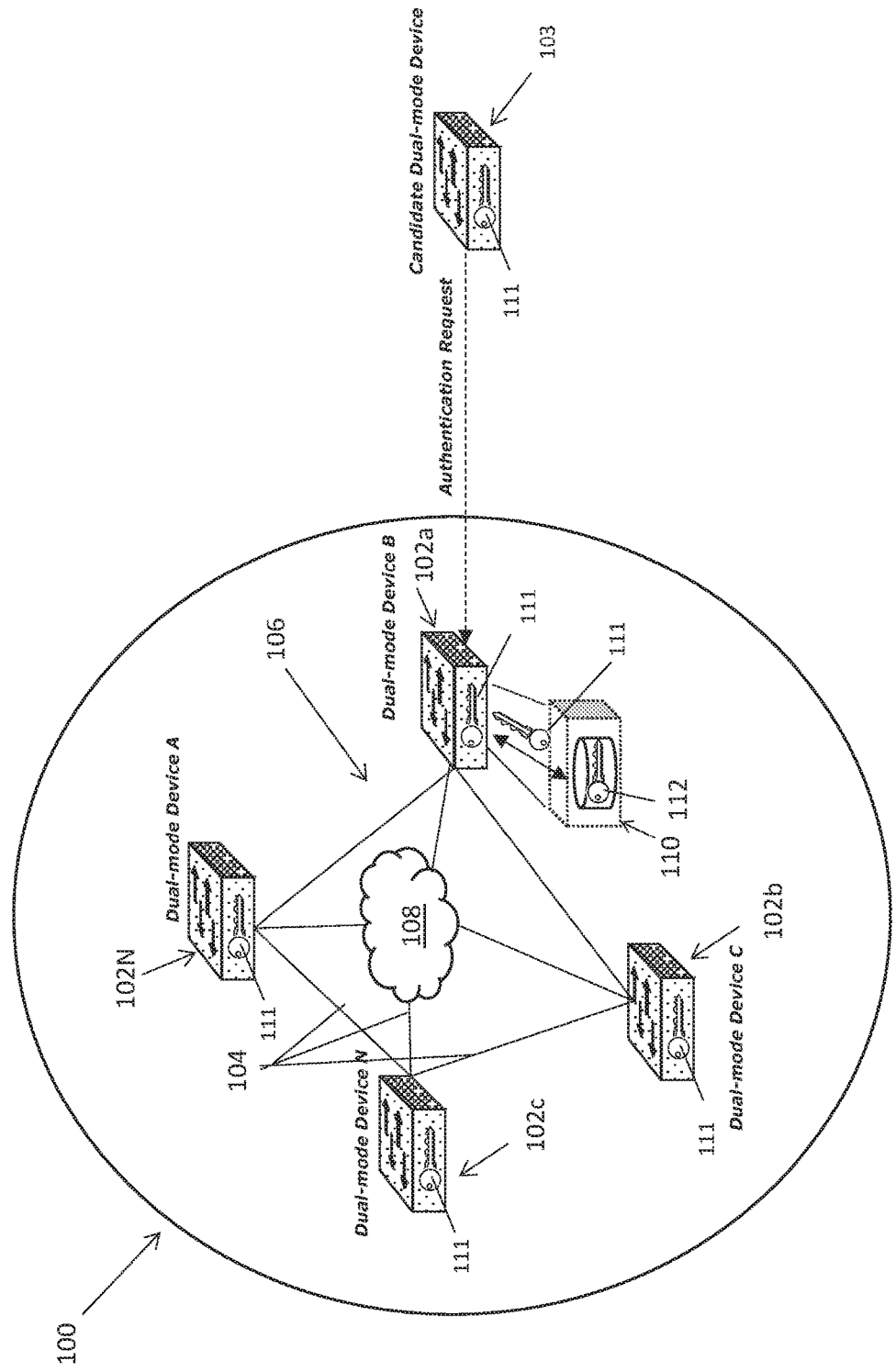
FIG. 1 is a diagram of a large-scale Ethernet mesh network according to a non-limiting embodiment.

With reference now to FIG. 1, a large-scale Ethernet-based mesh network 100 configured to provide authenticator redundancy and failover protection measures is illustrated according to a non-limiting embodiment. The large-scale Ethernet mesh network 100 includes a plurality of dual-mode peer devices 102a-102N. In one or more embodiments, the large-scale Ethernet mesh network 100 is constructed as a large mesh layer 2 Ethernet network and is configured to manage authenticated and protected key agreements between the dual-mode peer devices 102a-102N. Although the large-scale Ethernet mesh network 100 is illustrated as including four authenticated dual-mode peer devices 102a-102N, the large-scale Ethernet mesh network 100 is not limited there to, and in fact can include upwards of one-hundred dual-mode peer devices 102a-102N.

Each authenticated dual-mode peer device 102a-102N establishes a plurality of secured data links 104 between one another, which allows for the exchange of secured user data such as, for example, 802.1X EAPOL and MACsec secured user data. The collection of data links 104 defines a group connectivity association (CA) 106 of service access points secured by a shared group key to form a local area network (LAN) 108 such as, for example, a LAN cloud network. In one or more embodiments, the group CA 106 operates according to IEEE 802.1X and MACsec protocols. Any one of the authenticated peer devices 102a-102N can be constructed as an electronic hardware controller that includes memory and a processor configured to execute algorithms and computer-readable program instructions stored in the memory.

The dual-mode peer devices 102a-102N are each constructed as an electronic authenticator module and supplicant module. Accordingly, each dual-mode peer device 102a-102N can simultaneously operate in an authenticator mode and a supplicant mode. One of the dual-mode peer devices 102a-102N can also operate as a key server 110 following election procedures described in greater detail below. The dual-mode peer devices 102a-102N each use a shared traffic key 111 known as a Secure Association Key (SAK) 111, which serves as a shared group encryption key that secures the user data (encrypts data and decrypts data) sent over the data routing links 104.

Figure 2:
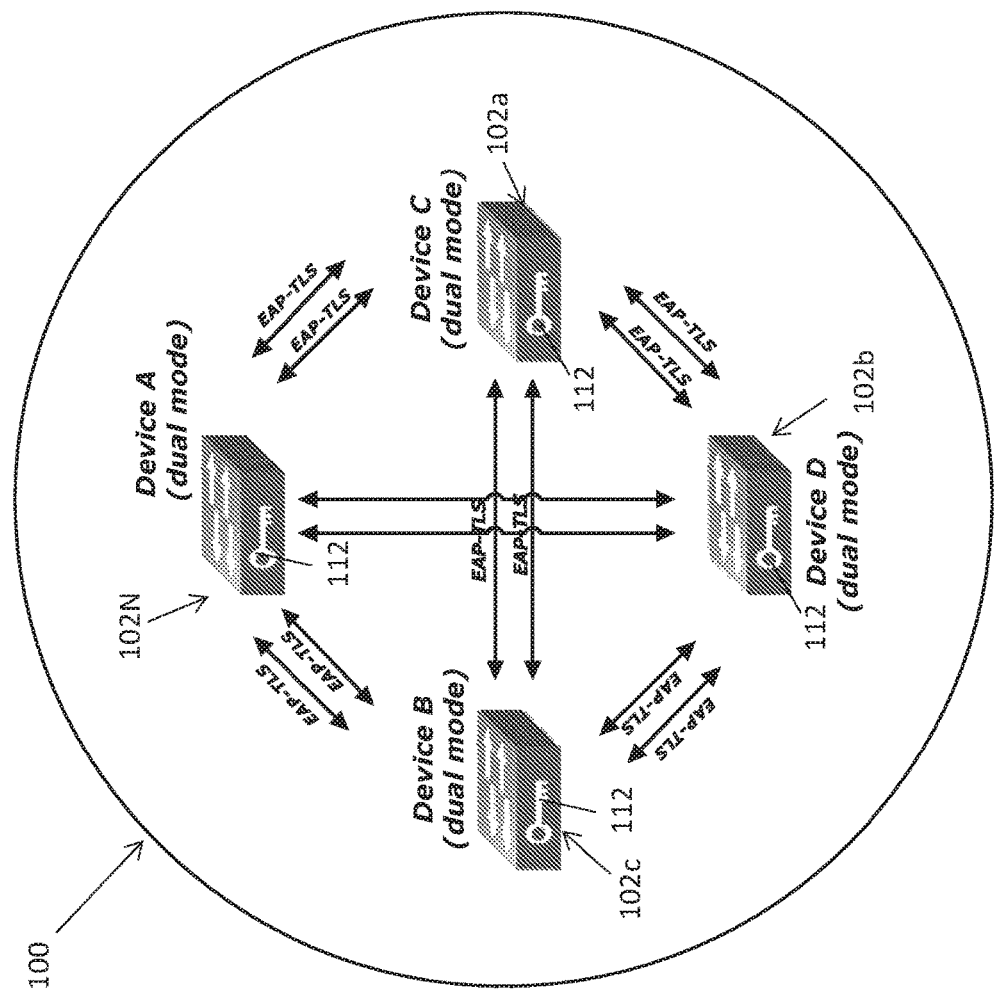
FIG. 2 is a diagram of the large-scale Ethernet mesh network performing simultaneous authentication exchanges between various dual-mode peer devices according to a non-limiting embodiment.

A given dual-mode peer device 102a-102N can utilize its integrated key server 110 to generate the SAK 111. In one or more embodiments, the key sever 110 is constructed as a hardware controller and is configured to derive the SAK 111 from a Connectivity Association Key (CAK) 112. The derived SAK 111 is then distributed to each authenticated dual-mode peer device 102a-102N operating in the group CA 106. Accordingly, the dual-mode peer devices 102a-102N can perform simultaneous authentication exchanges (e.g., according to Extensible Authentication Protocol-Transport Layer Security (EAP-TLS) between one another (see FIG. 2). In one or more embodiments, an authenticated peer device 102N can exit the group CA 106, but retain its authentication key. In this manner, the exiting peer device 102 can rapidly re-join the group CA 106.

In one or more non-limiting embodiments, a dual-mode peer device is elected to serve as a key server. Accordingly, the elected dual-mode peer device can invoke the authenticator mode, which utilizes the integrated key server to distribute the CAK 112 and the SAK 111 to each of the remaining dual-mode peer devices.

In at least one non-limiting embodiment, a key server change event can occur, which prompts all dual-mode peer devices in the group CA 106 to elect a new dual-mode peer device to operate as the key server. The newly elected dual-mode peer device distributes a new shared group encryption key to each of the remaining dual-mode peer devices. The key server change event causing the change in an elected key server can include, but is not limited to, a new peer device joining the group CA 106, an existing peer device leaving the group CA 106, a previously authenticated dual-mode peer device leaving the group CA 106 and attempting to re-join the group CA 106, a dual-mode peer device elected as a key server leaving the group CA 106 and/or attempting to rejoin the group CA 106, a network outage, and a group CA fragmentation and re-assembly.

To establish the group CA 106, the participating dual-mode peer devices 102a-102N agree to select a dual-mode peer device, e.g., peer device 102b, to operate as a key server peer device. The selected key server peer device 102b is then responsible for generating the CAK 112 and distributing the SAK 111. If a CAK 112 is pair wise and derived directly from an Extensible Authentication Protocol (EAP), the key server peer device 102b will be the MACsec Key Agreement (MKA) participant for the Port Access Entity (PAE) that was the EAP authenticator. When a participant uses a CAK not directly derived from EAP, it can select a different peer device 102N to perform the MKA using a key server priority identifier (ID) encoded in each MKA Protocol Data Unit (MKPDU). In this case, participating dual-mode peer devices 102a-102N select a live participant advertising the highest priority as its key server peer device whenever the group CA membership changes, e.g., when peer devices are added or removed from the group CA 106. In the event of a tie, the participant chooses the peer device 102N with the highest priority (numerically lowest) Secure Channel Identifier (SCI), which comprises the peer device's MAC, address, and 802.1X port number.

Figure 3:
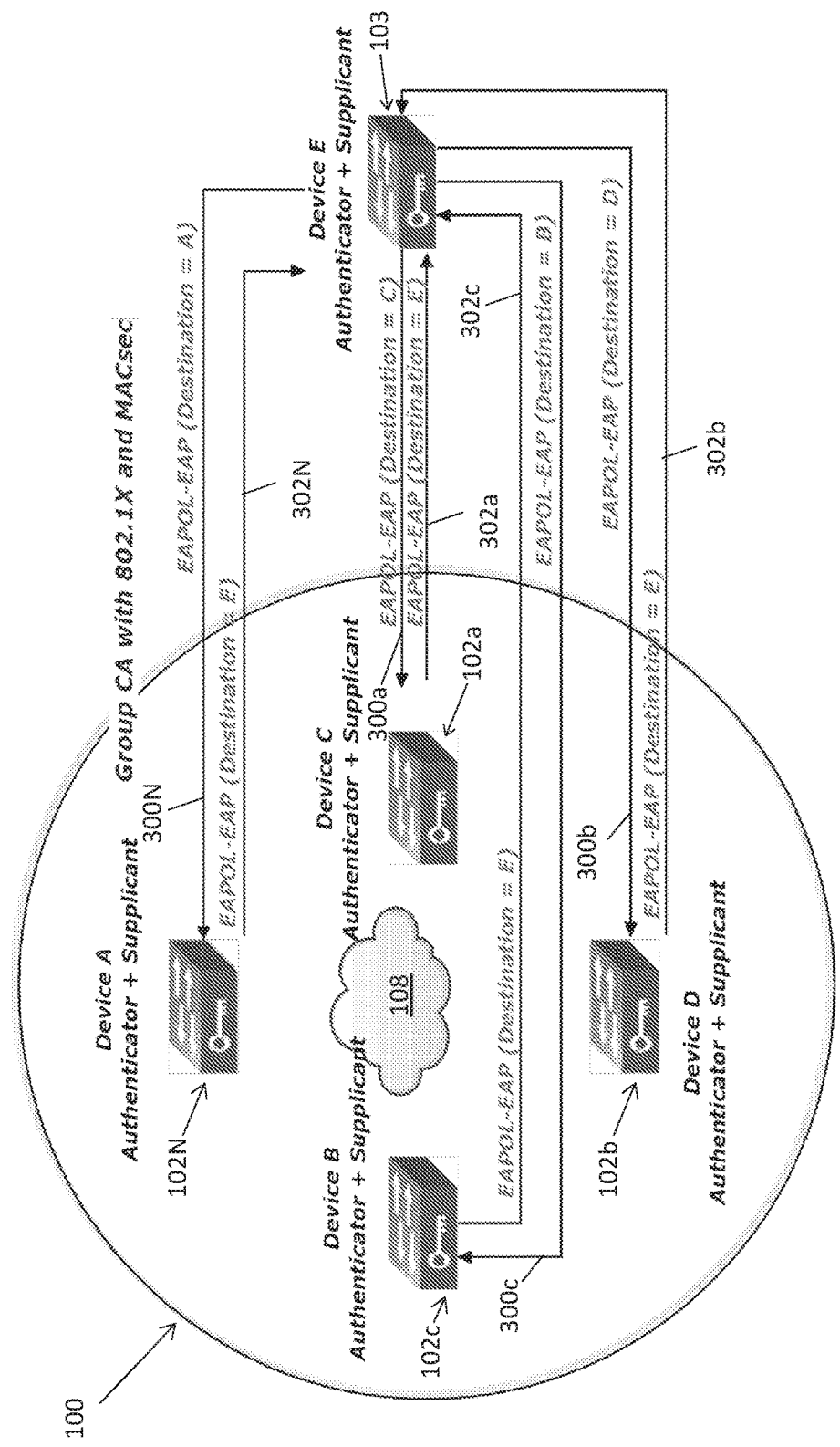
FIG. 3 is a diagram of the large-scale Ethernet mesh network performing simultaneous encapsulated authentication exchanges between a candidate dual-mode peer device and a plurality of authenticated dual-mode peer devices according to a non-limiting embodiment.

Turning now to FIG. 3, the large-scale Ethernet mesh network 100 is illustrated performing simultaneous encapsulated authentication exchanges 300 between a candidate dual-mode peer device and a plurality of authenticated dual-mode peer devices according to a non-limiting embodiment. The dual-mode peer devices 102a-102N implement authentication port access (PACP) state machines (SMs) capable of controlling a MAC Security Entities (SecY). The PACP SMs are configured to provide dual-mode operation of the peer devices 102a-102N and 103 to ensure continued presence of an authenticator in a group CA 106.

Authentication of the peer devices 102a-102N and/or 103 can include a logon process to manage the use of authentication credentials, initiating use of the PAE's supplicant and or authenticator functionality, deriving the CAK, deriving the Connectivity Association Key Name (CKN) tuples from PAE results, maintaining pre-shared keys (PSKs), and for managing MKA instances.

Still referring to FIG. 3, the authenticated dual-mode peer devices 102a-102N can collectively authenticate a candidate dual-mode peer device 103. The candidate dual-mode peer device outputs an Extensible Authentication Protocol over LAN-Extensible Authentication Protocol (EAPOL-EAP) messages 300a-300N to each of the authenticated dual-mode peer devices 102a-102N. In response to the source and receiving a source EAPOL-EAP message 300a-300N, a respective dual-mode peer device 102a-102N outputs an acknowledgement (ACK) EAPOL-EAP message 302a-302N.

In one or more embodiments the source EAPOL-EAP messages 300a-300N and destination EAPOL-EAP messages 302a-302N facilitate a unicast EAPOL-EAP and EAPOL-Start PDU addressing scheme to ensure complete bi-directional authentication of all peers and periodic multicast EAPOL-Announcement transmission to ensure continuous peer discovery.

When the logon process requests authentication, the candidate dual-mode peer device 103 transmits an EAPOL-start frame to one or more dual-mode peer devices 102a-102N already participating in the group CA 106. The PACP of a recipient dual-mode peer device 102a-102N instructs the EAP higher layer to stop any authentication attempt and restart with its first EAP request. In at least one embodiment, a unicast address is used as the destination MAC address for EAPOL-Start messages transmitted by a candidate dual-mode peer device 103. Because the mesh network 100 includes multiple dual-mode peer devices 102a-102N, the transmission of EAPOL-Start messages whose destination addresses are peer specific, are learned from the result of per device EAPOL-Announcements, which are described in greater detail below.

In one or more embodiments, the dual-mode peer devices 102a-102N generate EAPOL-Announcement PDUs. The multicast announcement PDUs transmitted by each dual-mode peer device 102a-102N contains, among other information, a member identifier (ID) that is unique to an individual dual-mode peer device 102a-102N. In this manner, the announcements allow every authenticated dual-mode peer devices 102a-102N to determine the number of live authenticated peer devices 102a-102N currently present in the group CA 106.

Figure 4:
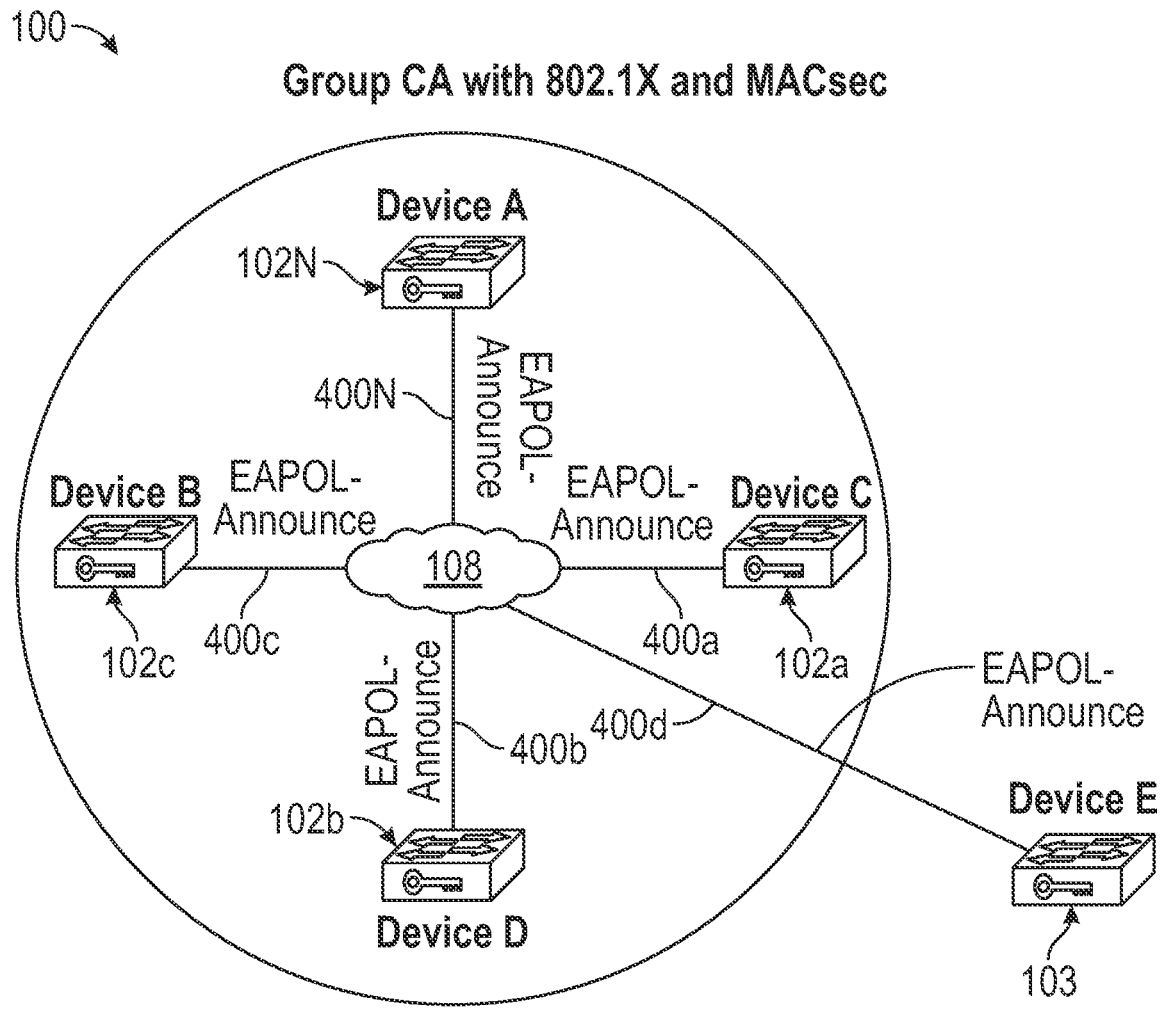
FIG. 4 is a diagram of the large-scale Ethernet mesh network including a plurality of dual-mode peer devices performing discovery via transmission of individual multicast announcement protocol data units (PDUs) according to a non-limiting embodiment.

Referring to FIG. 4, the dual-mode peer devices 102a-102N are configured to perform a periodic and continual transmission of EAPOL-announcement PDUs 400a-400N to ensure that every dual-mode peer device 102a-102N participating in the group CA 106 and/or candidate dual-mode peer devices 103 can discover each other's presence following restoration of network connectivity. The dual-mode peer devices 102a-102N can utilize these EAPOL-Announcement PDUs as a discovery mechanism where there is fluctuation in connectivity, e.g., when roaming conditions are present.

The announcement PDUs can be transmitted at a set interval, either every 5 seconds, for example, or at a different configurable time. Therefore, as part of a comprehensive solution for high availability, dual-mode devices 102a-102N participating in the group CA 106 can commence continuous announcement transmission on real port enable to ensure discovery of peer devices for the purposes of mutual authentication. Dual-mode peer devices 102a-102N can then listen for these announcements in order to initiate PACP SM authentication with the transmitting peer where the information provided in the Announcement PDU indicates possible group connectivity.

In at least one embodiment, the dual-mode devices 102a-102N and candidate devices 103 initiate PACP SM authentication on receipt of an EAPOL-Announcement PDU 400a-400N. An EAPOL-Announcement PDU 400a-400N includes, but is not limited to, the following advertised information: a Network Identifier (NID); Group Access capability; Group Access status; MACsec Cipher Suite configuration data; and an organizationally specific Key Management Domain (KMD) list containing the KMD values in byte form for each cached CAK. In one or more embodiments, the EAPOL-Announcement PDUs 400a-400N contain an organizationally specific KMD List-Type Length Value (TLV) for each cached pair wise CAK. The organizationally specific KMD List-Type Length Value (TLV) is a non-standard feature, which allows for accommodating large group CAs 106. A null (zero length) KMD List TLV implies the authenticator does not possess any keys in the cache.

In at least one embodiment, the dual-mode peer devices 102a-102N are configured to support jumbo frames in order to properly perform an MKA peer liveliness operation, which involves multicasting an EAPOL-MKA PDUs or beacon signal (sometimes referred to as a "heartbeat message") at predetermined time intervals (e.g., every two seconds). These MKA heartbeat messages contain, among other data, live peer information indicating the current number of dual-mode peer devices 102a-102N currently operating in the group CA 106. The Jumbo frames are Ethernet frames capable of supporting a larger payload than standard Ethernet frames. For example, a standard Ethernet frame has a maximum transmission unit (MTU) of 1,500 bytes, and therefore cannot be utilized to generate the larger MKA heartbeat messages necessary to maintain functionality of an Ethernet-based mesh network containing more than 30 nodes. Jumbo frames, however, have an MTU that exceeds the standard Ethernet frame. In one or more embodiments, the mesh network 100 can support a jumbo frame having an MTU, for example, of up to 9,000 bytes. In this manner, the authenticated dual-mode peer devices 102a-102N can use jumbo frames to generate EAPOL-MKA PDUs taking into account the substantially large number of live authenticated peer devices 102a-102N that can operate in the large-scale Ethernet mesh network 100 at a given time.

Still referring to FIG. 4, the PACP SMs of the peer devices 102a-102N and 103 can be managed based on the state of a given PACP SM, i.e., whether the PACP SM of a given peer device 102N and/or 103 exists or does not exist in the group CA. For example, on receipt of an EAPOL-Announcement from a device for which an authenticator and supplicant PACP SM does not already exist, the receiving device will; (A) instantiate and enable an PACP SM of a peer device 102N operating in an authenticator mode identified by the source MAC address of the transmitter; and (B) instantiate and enable a PACP SM of a peer device 102N operating in a supplicant mode identified by the source MAC address of the transmitter and raise the authenticate interface.

On receipt of an EAPOL-Announcement from a device, not currently in the membership of the group CA, for which a PACP SM already exists, the Key Agreement Entity (KaY)

will: (A) raise the authenticate interface of the PACP SM if the announcement contains a null KMD List; (B) the KaY will raise the authenticate interface of the PACP SM if the announcement contains a KMD List specifying a key for which the receiver was operating in the authenticator mode and the sender was operating in the supplicant mode, but no corresponding key exists in the receiver's CAK cache; or (C) raise the authenticate interface of the PACP SM if the announcement does not contain a KMD that specifies a key for which the receiver was operating in the authenticator mode and the sender was operating in the supplicant mode.

Figure 5:
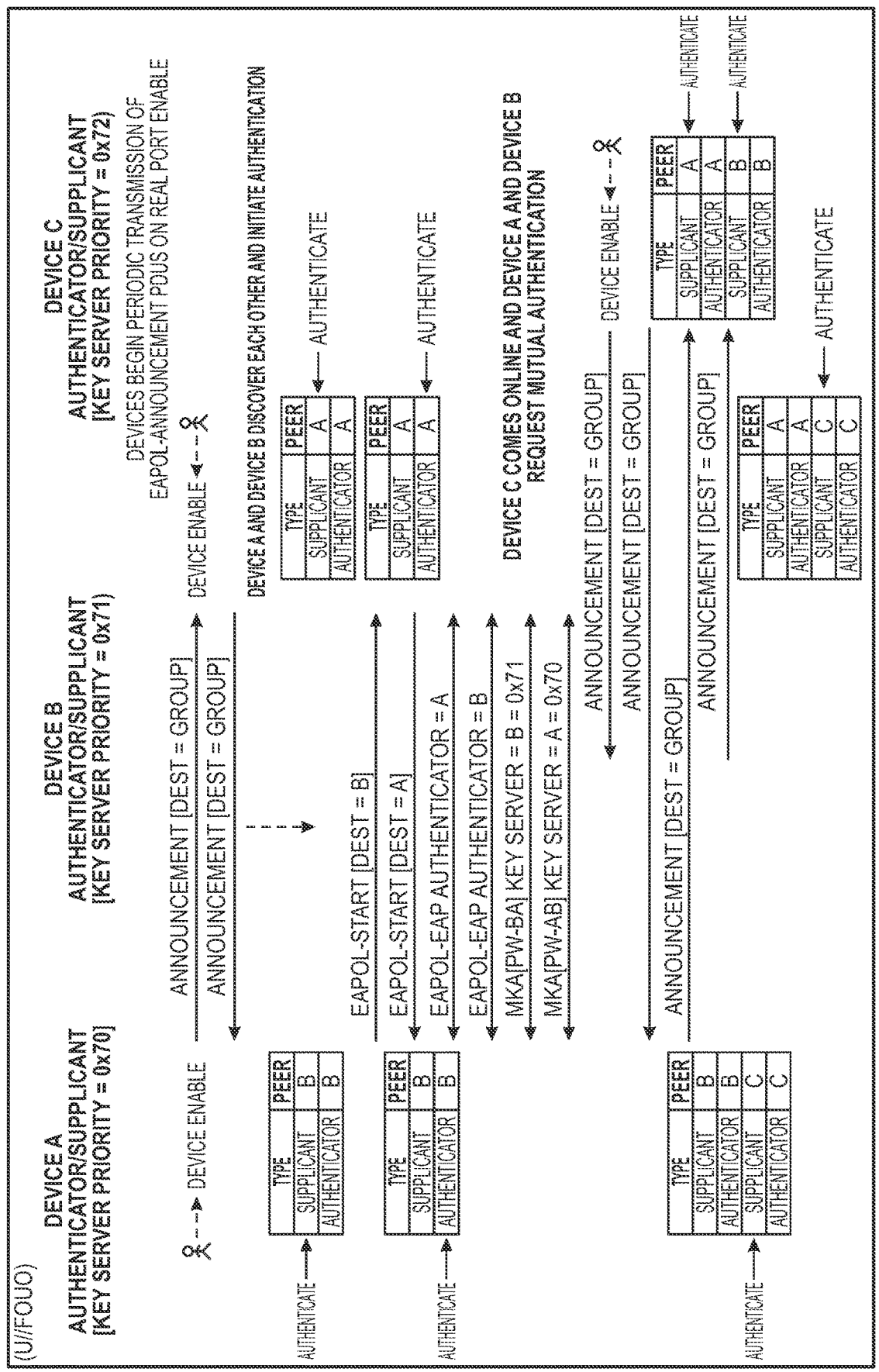
FIG. 5 is a signal diagram illustrating a pair wise exchange for facilitating a dual-mode peer device state machine management scheme according to a non-limiting embodiment.
Figure 5:
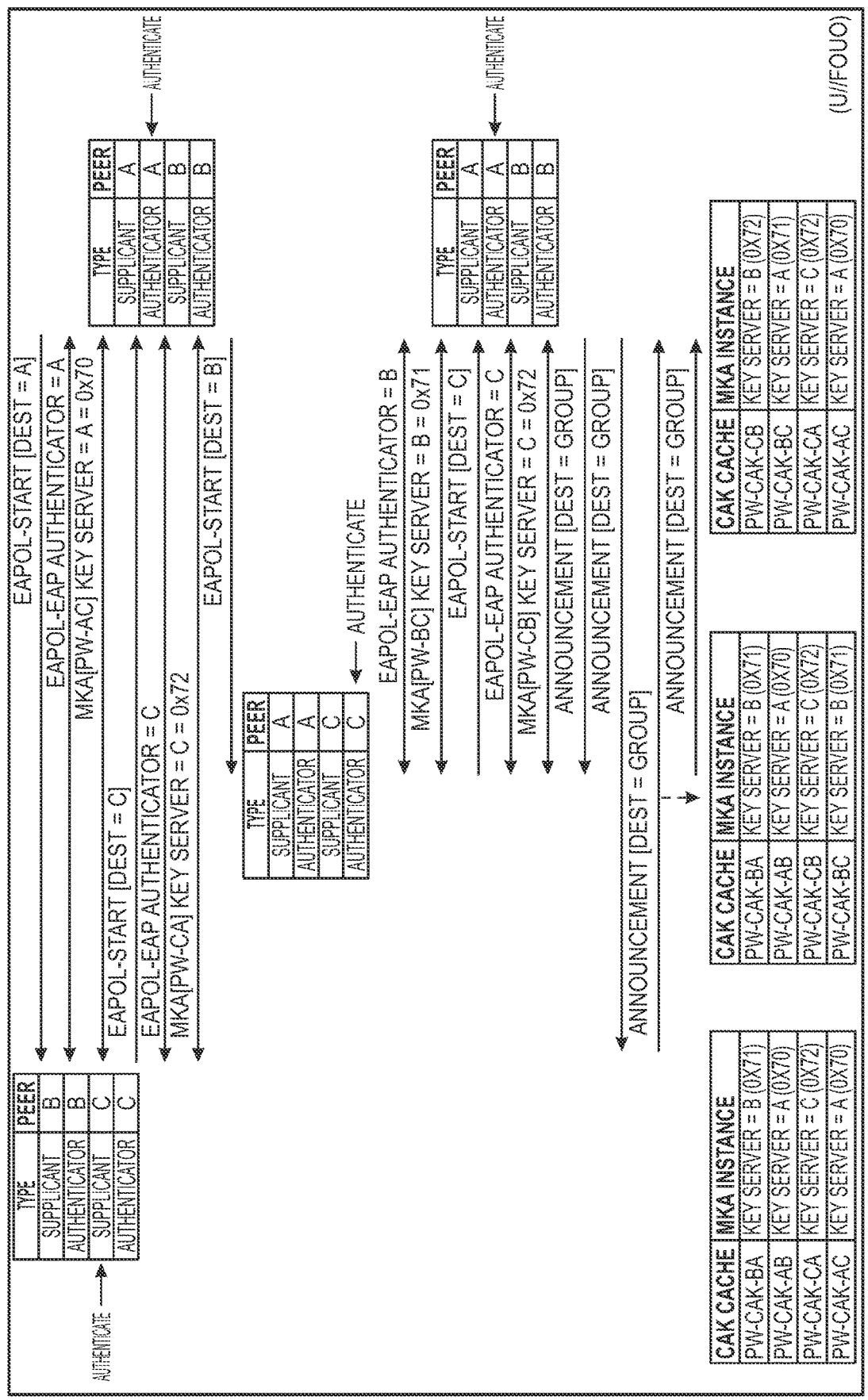

FIG. 5 illustrates a pair wise exchange for facilitating a PACP SM management scheme according to a non-limiting embodiment. Although FIG. 5 illustrates a PACP SM management during group CA formation including three devices, it should be appreciated that more devices, e.g., greater than 100 devices, can be implemented. The term "MKA[PW-AB]" indicates a pair wise CAK, derived from an authentication exchange where device A is operating in the authenticator mode, and device B is operating in supplicant mode and is being used to protect transmitted MKPDUs. At the conclusion of the authentication exchanges, each device has instantiated an authenticator and supplicant PACP SM and two pair wise CAKs for each of the other devices in the group CA.

Based on one or more embodiments described above, the large-scale Ethernet-based mesh network 100 can establish a group CA 106 using various heuristics to determine a principal actor, identify dual-mode devices 102a-102N acting as key servers, and distribute a group CAKs 112 and SAKs 111. The following terminology will be used with reference to this non-limiting embodiment: A "participant" refers to the personification of a single KaY's participation in a given MKA instance. An "actor" refers to the participant under discussion. A "successful actor" is referred to as an actor that has one or more live partners and is participating in an MKA instance that has elected a Key Server. A "principal actor" refers to the actor participating in the MKA instance with the highest priority Key Server. The "principal actor" is also a successful actor selected by a KaY to control its associated PAC or SecY. A "principal participant" refers the group participant identified as the "successful actor" having the highest elected priority Key Server.

Initial formation of the group CA 106 can identify candidates for principal actor selection by comparing a key server priority of each dual-mode peer device 102a-102N elected by successful actors using pair wise CAKs, and selecting those devices having the highest key server priority. A particular KaY can be identified as a key server by comparing the SCI of the KaY to that of the highest priority Key Server to determine if the KaY is the Key Server.

Once the peer device having the highest key server priority is identified, successful actors that have not elected the highest Key Server priority are removed, and a group CAK is distributed using the MKA instances and their pair wise CAKs that have elected the highest priority Key Server. In one or more embodiments, a KaY does not have the highest key server priority. In this case, the principal actor is set to the participant in the MKA instance that has elected the highest Key Server priority, and successful actors that have not elected the highest priority Key Server are removed.

In at least one embodiment, the dual-mode peer devices 102a-102N participating in a group CA can facilitate a group principal participant selection process by performing various heuristics to select a principal actor and key server that distributes keys via pair wise MKA instances. In this case, live peer discovery is performed as described herein, e.g., using EAPOL-MKA PDUs. Key server election is achieved by MKA participants using advertised Key Server Priority values and MAC addresses. Principal actor selection is achieved based on the selection of a KaY and heuristics.

For example, a KaY selects an MKA instance using a group CAK as the principal actor based on the desire of the PAE to use it to control the SecY. Selection of the MKA instance can be determined by establishing the group participant as a successful actor, and identifying the group participant as the successful actor that has elected the highest priority Key Server. Once a KaY with the highest key server priority is identified, a SAK is distributed using the group MKA instance and group CAK that is the principal participant when the SCI of the Kay is the Key Server. In at least one embodiment, the peer device with the selected KaY does not remove prior group participants until the new group CAK has established peer liveness with each of the CA members that were live peers of the distributing participant. In addition, a KaY that is not selected as the key server does not remove prior group participants until the key server is live using the received group CAK. As described above, one or more embodiments can allow dual-mode peer-devices 102a-102N to use passive MKA participation to remove MKA participants in the absence of received MKPDUs or an elected Key Server. However, the devices 102a-102N can retain pair wise CAKs in the CAK cache for later rapid re-authentication as described above.

The large-scale Ethernet-based mesh network 100 also establishes various heuristics to manage membership changes of dual-mode peer devices 102N and/or 103. Membership changes can include, for example, new dual-mode peer devices 103 joining the group CA 106 and/or authenticated dual-mode peer devices 102a-102N leaving the group CA 106.

Continuous operation of the group CA 106 upon a new dual-mode peer device 103 joining the group CA 106 is managed according to whether a key server change has occurred or has not occurred. When a key server change has not occurred, the dual-mode peer device 102N operating as the key server will distribute the current group CAK 112 to new dual-mode peer device 103 via the pair wise CAK. The elected dual-mode peer device 102N will then distribute a new SAK 111 on membership change of the group CAK 112. When a key server change has occurred, the dual-mode peer device 102N that is the newly elected key server will distribute a new CAK 112 to all peers via pair wise CAKs, and the newly elected peer-device will distribute a new SAK 111 based on the new group CAK 112.

Similarly, continuous operation of the group CA 106 when one or more authenticated dual-mode peer devices 102a-102N leave the group CA 106 is managed according to whether a key server change has occurred or has not occurred. When a key server change has not occurred, the dual-mode peer device currently elected to operate as the key server will distribute a new SAK 111 on membership change of the group CAK 112.

Turning now to FIGS. 6A and 6B, the large-scale Ethernet mesh network is illustrated performing an outage recovery process according to a non-limiting embodiment. FIG. 6A illustrates fragmentation of the initial group CA 106 into two sub-group CAs 106a and 106b due to a temporary outage of the network 108. A first device 102c and one or more other devices 102N continue to operate in the first sub-group CA 106a where the first device 102c remains operating as the key server. Devices 102a and 102b form new sub-group CA 106b, in which device 102a is elected as the key server.

Accordingly, device 102a delivers a new group CAK 112a to ensure the integrity of the group CAK lifetime. Device 102N and device 102a serve as key servers for their respective group CA 101a and 101b, and therefore, deliver a new SAK due to a change in membership. In at least one embodiment, the devices 102a-102N use passive MKA participation, and remove participants in the absence of received MKPDUs due to a temporary network outage.

Turning to FIG. 6B, the original group CA 100 is reestablished upon restoration of the network 108. On restoration of network connectivity, the devices 102a-102N initiate re-authentication in order to establish pair wise connectivity with the highest priority key server, e.g., device 102N, which then delivers the group CAK to newly added members. In at least one embodiment, the devices 102a-102N are configured to retain pair wise CAKs in the cache on participant removal. In this example, re-authentication is not required between devices 102a-102N to allow reformation of the original group CA 100. On restoration of the network 108, the devices 102a-102N activate pair wise MKA participants for pair wise CAKs present in the CAK cache, as indicated by received announcements. Device 102N also resumes its role as the highest priority Key Server and distributes a new SAK.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements that fall within the scope of the claims that follow. These claims should be construed to maintain the proper protection for the invention first described.

What is claimed is:

1. A large-scale Ethernet mesh network comprising:
a plurality of dual-mode peer devices, each of the dual-mode peer devices implementing an authenticator port access state machine (PACP SM) and a supplicant PACP SM each configured to operate in accordance with a modified Institute of Electrical and Electronics Engineers (IEEE) 802.1X standard for port-based network access control, the plurality of dual-mode peer devices in signal communication with one another so as to establish a group connectivity association (CA), the authenticator PACP SM and the supplicant PACP SM configured to simultaneously operate in a supplicant mode and authenticator mode, respectively, to ensure continued presence of at least one of the dual-mode peer devices operating as an authenticator in the group CA,
wherein each of dual-mode peer device is configured to encrypt data using a shared group encryption key (SAK), and to exchange the encrypted data with peer devices in the group CA, and
wherein the plurality of dual-mode peer devices are configured to continue operation of the group CA in response to one or more of the dual-mode peer devices leave the group CA,
wherein the remaining dual-mode peer devices continue simultaneously operating in the supplicant mode and the authenticator mode after the one or more of the dual-mode peer devices leave the group CA, and wherein at least one of the remaining dual-mode peer devices is selected as a newly elected key server in response to a key server change event, and the newly elected key server delivers a new group of Connectivity Association Keys (CAKs) to ensure the integrity of the group CAKs lifetime.

2. The large-scale Ethernet mesh network of claim 1, wherein a plurality of the dual-mode peer devices authenticate all other peer devices in the group CA in response to peer discovery of a dual-mode peer device among the plurality of dual-mode peer devices.

3. The large-scale Ethernet mesh network of claim 1, wherein a dual-mode peer device among the plurality of dual-mode peer devices is elected as a key server using heuristics for principal actor and key server election, and the elected dual-mode peer device distributes the shared group encryption key (SAK) to each of the remaining dual-mode peer devices.

4. The large-scale Ethernet mesh network of claim 1, wherein the newly elected dual-mode peer device distributes a shared group key (CAK) via pair wise CAKs to each of the remaining dual-mode peer devices, and distributes a new shared group encryption key (SAK) to each of the remaining dual-mode peer devices.

5. The large-scale Ethernet mesh network of claim 1, wherein the key server change event includes at least one of a new dual-mode peer device joining the group CA, an existing dual-mode peer device leaving the group CA, a previously authenticated dual-mode peer device leaving the group CA and attempting to re-join the group CA, an elected dual-mode peer device leaving the group CA and/or attempting to rejoin the group CA, a fragmentation and re-assembly of the group CA, and a network outage.

6. The large-scale Ethernet mesh network of claim 1, wherein each dual-mode peer device transmits a multicast addressed protocol data unit (PDU) signal to one another so as to identify its respective presence.

7. The large-scale Ethernet mesh network of claim 6, wherein the PDU signal is an Extensible Authentication Protocol over LAN (EAPOL)—Announcement message that is multicast at a set time interval to ensure continuous peer discovery.

8. The large-scale Ethernet mesh network of claim 7, wherein each dual-mode peer device uses unicast addresses for EAPOL-EAP and EAPOL-Start PDU transmission having actively learned a destination address of the remaining dual-mode peer devices in response to receiving the EAPOL-Announcement message.

9. The large-scale Ethernet mesh network of claim 1, wherein the plurality of dual-mode peer devices includes at least thirty-one dual-mode peer devices.

10. A method of exchanging data in a large-scale Ethernet mesh network, the method comprising:
establishing signal communication between a plurality of dual-mode peer devices, each of the dual-mode peer devices implementing an authenticator port access state machine (PACP SM) and a supplicant PACP SM each operating in accordance with a modified Institute of Electrical and Electronics Engineers (IEEE) 802.1X standard for port-based network access control;

mutually authenticating a plurality of dual-mode peer devices to form a group connectivity association (CA);

simultaneously operating the authenticator PACP SM an authenticator mode and the supplicant PACP SM in a supplicant mode to ensure continued presence of at least one of the dual-mode peer devices operating as an authenticator in the group CA;

exchanging encrypted data between sending dual-mode peer devices and receiving dual-mode peer devices in the group CA, using a shared group encryption key (SAK), wherein the plurality of dual-mode peer devices are configured to continue operation of the group CA in response to one or more of the dual-mode peer devices leave the group CA, and wherein the continued operation includes:

selecting at least one of the dual-mode peer devices participating in the group CA as a newly elected dual-mode peer device in response to a key server change event, wherein the remaining dual-mode peer devices continue simultaneously operating in the supplicant mode and the authenticator mode after the one or more of the dual-mode peer devices leave the group CA; and delivering a new group of Connectivity Association Keys (CAKs) by the newly elected key server to ensure the integrity of the group CAKs lifetime.

11. The method of claim 10, wherein each dual-mode peer device is assigned a key server priority, and wherein each of the plurality of dual-mode peer devices are assigned a key server priority based on heuristics for principal actor and key server election, and wherein at least one the dual-mode peer devices is elected as a key server based on its key server priority.

12. The method of claim 11, further comprising distributing, via the dual-mode peer device elected as the key server, the shared group encryption key (SAK) to each of the remaining dual-mode peer devices.

13. The method of claim 10, wherein the newly elected dual-mode peer device distributes a shared group key (CAK) via pair wise CAKs to each of the remaining dual-mode peer devices, distributes a new shared group encryption key (SAK) to each of the remaining dual-mode peer devices.

14. The method of claim 10, wherein the key server change event includes at least one of a new dual-mode peer device joining the group CA, an existing dual-mode peer device leaving the group CA, a previously authenticated dual-mode peer device leaving the group CA and attempting to re-join the group CA, an elected dual-mode peer device leaving the group CA and/or attempting to rejoin the group CA, a fragmentation and re-assembly of the group CA, and a network outage.

15. The method of claim 10, further comprising performing a multicast transmission, via each dual-mode peer device, to transmit a protocol data unit (PDU) signal to one another so as to identify its respective presence in the group CA.

16. The method of claim 15, wherein the PDU signal is an Extensible Authentication Protocol over LAN—Announcement (EAPOL-Announcement) message that is multicast at a set time interval to ensure continuous peer discovery.

17. The method of claim 16, wherein each dual-mode peer device uses unicast addresses for EAPOL-EAP and EAPOL-Start PDU transmission having actively learned a destination address of the remaining dual-mode peer devices in response to receiving the EAPOL-Announcement message.

18. The method of claim 10, wherein the plurality of dual-mode peer devices includes at least thirty-one dual-mode peer devices.

* * * * *